United States Patent [19]

Kern

[11] Patent Number: 4,541,112

[45] Date of Patent: Sep. 10, 1985

[54] ELECTROACOUSTIC TRANSDUCER SYSTEM

[75] Inventor: Otmar Kern, Berlin, Fed. Rep. of Germany

[73] Assignee: Georg Neumann GmbH, Berlin, Fed. Rep. of Germany

[21] Appl. No.: 504,309

[22] Filed: Jun. 14, 1983

[30] Foreign Application Priority Data

Jun. 14, 1982 [DE] Fed. Rep. of Germany ....... 3222295

[51] Int. Cl.³ ....................... H04R 3/00; H04K 17/04; H02M 3/335

[52] U.S. Cl. .................................... 381/113; 330/127; 363/20; 381/120; 381/122

[58] Field of Search ............... 381/113, 111, 120, 122; 330/127, 130; 363/20

[56] References Cited

U.S. PATENT DOCUMENTS 3,422,225 1/1969 Griese ................................ 381/111

*Primary Examiner*—Gene Z. Rubinson
*Assistant Examiner*—Danita R. Byrd
*Attorney, Agent, or Firm*—Karl F. Ross; Herbert Dubno

[57] ABSTRACT

An electroacoustic transducer system comprises a microphone working into a low-frequency amplifier for the energization of an a-c load such as, for example, a loudspeaker or a volume indicator at a control panel. Biasing voltage for the microphone and operating current for the amplifier are derived from a d-c source, via a phantom circuit including the output leads of the amplifier and through a coupler in cascade with a chopper; the latter includes a transistor conducting intermittently under the control of an adjustable pulse generator whose pulse width is varied by negative feedback from the integrated chopper output. An output transformer with a primary in series with the transistor has several secondaries each connected across a storage capacitor through a diode for the generation of a relatively high biasing voltage for the microphone, a relatively low driving voltage for the amplifier and, possibly, a further voltage used to vary the directional pattern of the microphone. To facilitate the establishment of different voltage levels, the development of the lower voltage is delayed—by the combination of a choke with a Zener diode, or by a thyristor—until the higher voltage has been reached by a transient occurring at the beginning of each cutoff phase.

12 Claims, 5 Drawing Figures

ELECTROACOUSTIC TRANSDUCER SYSTEM

FIELD OF THE INVENTION

My present invention relates to an electroacoustic transducer system including a capacitive microphone, e.g. as used for monitoring sound effects in a broadcasting studio.

BACKGROUND OF THE INVENTION

A conventional transducer system of this type, e.g. as marketed under the designation U89 by the assignee of my present invention, comprises a capacitive microphone of high input impedance virtually constituting an open circuit for direct current, this microphone is connected to an amplifier which feeds an alternating-current load through a step-down transformer and a two-wire line. Biasing voltage for the microphone and operating current for the amplifier are supplied by a d-c source whose high-voltage terminal is connected to the two line conductors via a pair of symmetrical resistors forming part of a phantom circuit. A convenient d-c source is a 48 V battery which, in the particular system referred to, lets the amplifier operate with an output power of about 1 mW RMS; with a load—e.g. a measuring instrument or a speaker—having an impedance of 1 kilo-ohm, this corresponds to a current of 1 mA for an output voltage of 1 V RMS. With the supply voltage referred to, delivered to the line conductors via resistors of 6.8 ohms each, the maximum output voltage of the amplifier is 10 V RMS which calls for a step-down ratio of 1:10 of the coupling transformer.

The interposition of such a transformer between the amplifier output and the load tends to distort the signal and also encumbers the assembly. Prior attempts to eliminate this transformer have led to imperfect impedance matching with resulting limitation of the dynamic range of the microphone.

OBJECT OF THE INVENTION

The object of my present invention, therefore, is to provide a transducer system of the general type referred to which obviates the aforementioned drawbacks by eliminating the need for a coupling transformer in the signal path.

SUMMARY OF THE INVENTION

I realize this object, in accordance with the present invention, by the provision of coupling means connected to the output circuit of the amplifier, at a location remote from the source of direct current also connected to that circuit, for extracting this direct current and feeding it to a d-c/d-c converter which derives therefrom a first and a second unipolar voltage. With the aid of suitable conductor means, the first unipolar voltage is fed to a biasing terminal of the high-impedance operating circuit of the microphone while the second unipolar voltage is delivered to an energizing input of the associated amplifier.

Advantageously, pursuant to a more particular feature of my invention, the converter is provided with a feedback connection from the aforementioned conductor means designed to vary its step-down ratio for stabilizing at least the second unipolar voltage—fed to the amplifier—against variations in the terminal voltage of the source. For this purpose I prefer to design the d-c/d-c converter as a chopper having an electronic switch in series with a primary winding of a transformer which, in contradistinction to the known arrangement described above, lies in a branch path not traversed by signal current. The electronic switch is controlled by an adjustable pulse generator which periodically blocks the flow of direct current from the coupler through the transformer primary, this blocking occurring during cutoff periods of variable duration determined by the feedback connection. The transformer has secondary winding means connected to first and second integrating means for respectively generating the first and the second unipolar voltage.

Since the biasing voltage for the microphone is generally higher than the energizing voltage needed for the operation of the amplifier, and since the microphone draws virtually no direct current, the former—i.e. the first unipolar voltage emitted by the converter—can be obtained from a brief transient such as that generated in a secondary of the branch transformer at the beginning of a cutoff period. With a suitably chosen transformer ratio I can make the leading edge of that transient high enough to supply what little power is needed for the maintenance of the requisite biasing level, provided that a premature dissipation of the transient energy in the integrator for the amplifier energization is prevented. For this purpose, in accordance with yet another feature of my invention, I prefer to include respective diodes in the first and second integrating means that are poled to conduct only in response to transient voltages occurring in an initial phase of a cutoff period along with delay means inhibiting a charging of a storage capacitor of the second integrating means until the transient voltage then occurring has reached a magnitude corresponding to the relatively high first unipolar voltage. As more fully described hereinafter, the delay means may comprise a Zener diode in series with that storage capacitor and in shunt with a choke; alternatively, I may use a thyristor in series with that capacitor which is triggerable by a voltage comparator as soon as the transient attains the desired voltage level as established by a supply of reference voltage which could be a storage capacitor of the first integrating means.

BRIEF DESCRIPTION OF THE DRAWING

The above and other features of my invention will now be described in detail with reference to the accompanying drawing in which.

SPECIFIC DESCRIPTION

Figure 1:
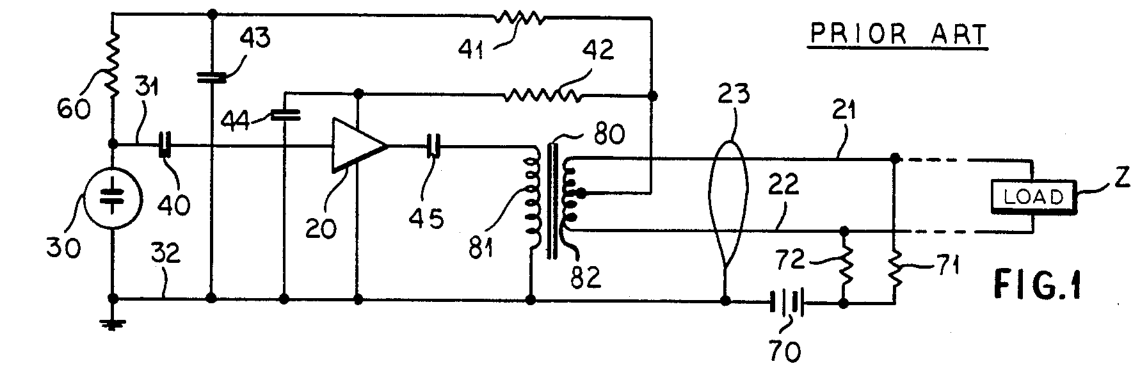
FIG. 1 is a circuit diagram of a conventional electroacoustic transducer system of the aforedescribed type.

FIG. 1 illustrates an electroacoustic transducer system of known type as discussed above, including a capacitive microphone 30 responsive to incident sound waves having a pair of output leads 31, 32 connected across its variable capacitance. Lead 31 is connected through a blocking condenser 40 to an input of an amplifier 20; the output of amplifier 20 and the grounded lead 32 are connected, in series with another blocking condenser 45, across the primary winding 81 of a coupling transformer 80. A secondary 82 of this transformer is connected, via a cable with two conductors 21 and 22, across a load Z which could be another amplifier, a loudspeaker or other suitable equipment. The cable has a grounded sheath 23.

The ungrounded terminal of microphone 30, connected to lead 31, receives positive biasing potential from a direct-current source 70—shown as a battery—via a phantom circuit including two identical resistors 71 and 72 connecting the ungrounded battery terminal to conductors 21 and 22 of the signal cable; the midpoint of transformer secondary 82 is connected to lead 31 via a voltage divider formed by two series resistors 41 and 60 whose junction is coupled to ground by way of a storage capacitor 43. Another RC network, comprising a resistor 42 in series with a storage capacitor 44, lies between the winding midpoint and ground to provide operating current for amplifier 20 whose energizing circuit extends between ground and the junction of resistor 42 with capacitor 44.

In a specific instance, in which the battery 70 has a terminal voltage of 48 V, the two balanced supply resistors 71, 72 each have a magnitude of 6.8 kΩ and the step-down ratio of transformer 80 is 10:1. The impedance of load Z (including its conductors 21, 22) is 10 kΩ so that a maximum signal voltage of 10 V RMS across primary winding 81 and a primary current of 0.1 mA RMS give rise to a load voltage of 1 V RMS and a secondary current of 1 mA RMS. The load voltage is, of course, independent of the supply voltage of +48 V delivered by battery 70 in conjugate relationship therewith.

Figure 2:
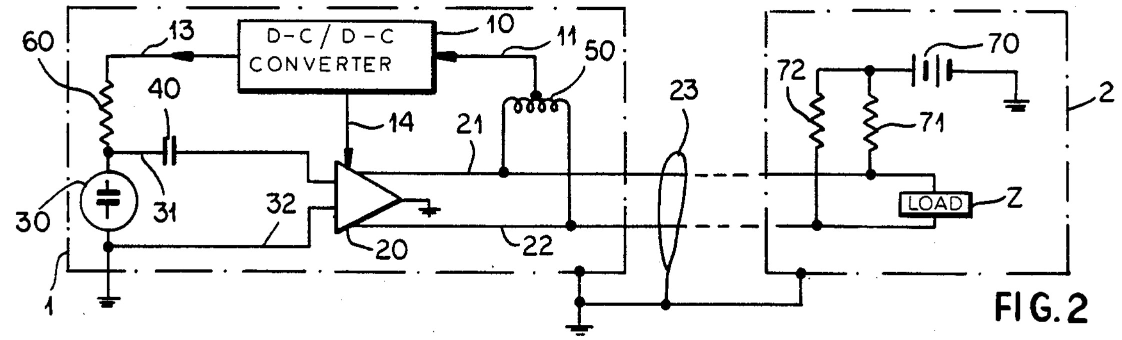
FIG. 2 is a circuit diagram similar to that of FIG. 1 but relating to the present improvement.

In order to eliminate the signal-distorting transformer 80 from the load circuit comprising wires 21 and 22, the improved transducer system shown in FIG. 2 comprises a d-c/d-c converter 10 forming part of a module 1 which includes the microphone 30 with leads 31, 32, capacitor 40, resistor 60 and amplifier 20 of FIG. 1. Load Z, supply resistors 71, 72 and battery 70 form part of another module 2 linked with module 1 via cable 21–23 establishing a conductive signal path between amplifier 20 and the load. Converter 10 has an input lead 11 and two output leads 13, 14. Lead 11 originates at the midpoint of a shunt impedance 50, shown as an inductance (though two balanced resistors could also be used, yet would dissipate more direct current), designed to avoid any short-circuiting of the load for the audio-frequency signals emitted by amplifier 20. Lead 13 extends to the biasing input of microphone 30 by way of resistor 60 while lead 14 terminates at an energizing input of the amplifier; the emitted signals are balanced with respect to ground.

Figure 3:
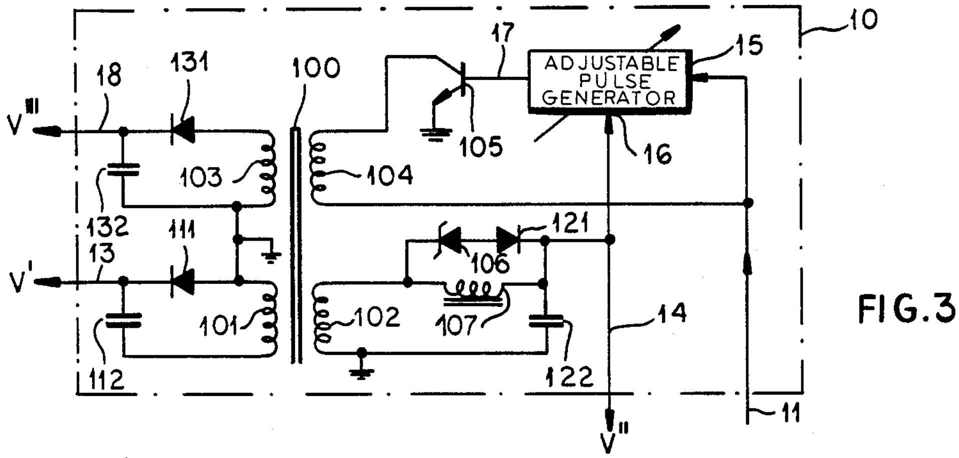
FIG. 3 shows details of a d-c/d-c converter forming part of the system of FIG. 2.

FIG. 3 shows details of converter 10 which essentially operates as a chopper by intermittently cutting off an electronic switch 105—here shown as an NPN transistor—with the aid of an adjustable pulse generator 15 having a control input 16 tied to its own output lead 14 in a negative-feedback loop. Generator 15 produces a train of rectangular pulses whose width is variable inversely with the output voltage on lead 14 to provide a duty ratio of up to 50%. The emitter/collector path of transistor 105 lies in series with the primary winding 104 of a transformer 100 having three secondary windings 101, 102, 103. Windings 101 and 102 are connected to output leads 13 and 14 via respective rectifying diodes 111 and 121 whose cathodes are returned to the opposite winding ends by way of capacitors 112 and 122. Capacitor 112 serves for the storage of a biasing voltage V′ for microphone 30 whereas capacitor 122 stores an operating voltage V″ for amplifier 20. Winding 103, which feeds a capacitor 132 through another diode 131, stores an ancillary voltage V‴ that can be used, for example, to control a phase shifter for altering the directional pattern of the microphone.

In accordance with an important feature of my present invention, the integrating network 121, 122 forming integrating means associated with the energizing lead 14 of amplifier 20 (FIG. 2) is provided with delay means comprising, in the embodiment of FIG. 3, a Zener diode 106 in series with rectifying diode 121 and a choke 107 shunting the two series-connected diodes. The breakdown threshold of Zener diode 106 is so chosen that, with capacitor 122 charged to the desired operating potential established by the feedback loop, any further charging of this capacitor is substantially inhibited until the voltage developed across secondary 102—with a polarity able to pass the diode 121—considerably exceeds that operating potential; with suitable poling of the diodes, this will occur at the very beginning of a cutoff period coming into existence upon the termination of a pulse from generator 15. A relatively high charge can therefore be maintained on capacitor 112 for which only leakage losses need to be compensated; it is also assumed that the pattern-controlling circuitry connected to lead 18 dissipates comparatively little energy. Generator 15 is powered by battery 70 through an extension of lead 11; the device controlled by lead 18 can be energized in a similar manner.

Figure 4:
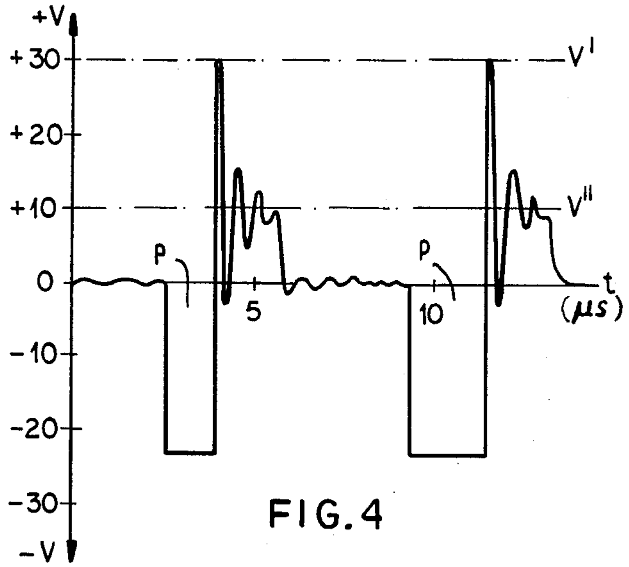
FIG. 4 is a graph relating to the operation of the converter shown in FIG. 3.

The aforedescribed operation of the converter 10 is illustrated in FIG. 4 which shows the output voltage of transformer 100—with the simplifying assumption that secondaries 101 and 102 have the same number of turns—plotted against time t. The graph shows voltage levels V′ = +30 V and V″ = +10 V, by way of example. Aside from minor oscillations due to parasitic capacitances, the transformer voltage is substantially zero during the latter part of each cutoff period separating successive pulses P which, as illustrated, may be of different widths as determined by the negative feedback. The recurrence period of these pulses is shown to be 6 μs.

A sharp peak occurring at the beginning of each cutoff period is stopped at voltage level V′ by the breakdown of Zener diode 106 after a brief initial phase sufficing for the replenishing of the charge of capacitors 112 and 132 even as the charging of capacitor 122 is blocked by the choke 107. After a brief negative swing due to the inductance of this choke, resulting in the quenching of Zener diode 106, the charge of capacitor 122 stabilizes around voltage level V″ whereupon the cycle is repeated.

Figure 5:
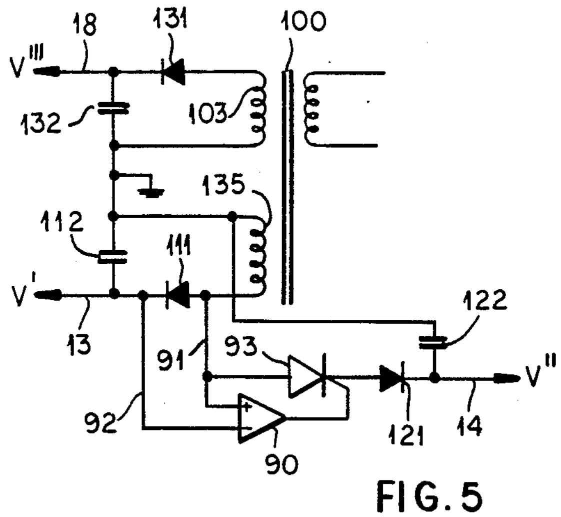
FIG. 5 shows a partial modification of the converter of FIG. 3.

FIG. 5 shows a modification according to which the delay in the recharging of capacitor 122 is brought about by another electronic switch, namely a thyristor 93 which lies in series with diode 121 and has a gate tied to the output of a comparator 90 designed to detect the attainment of level V′ by the voltage of a secondary 135 of transformer 100 which here replaces the two windings 101, 102 of FIG. 3; such a replacement could also be made in the latter embodiment whereas, conversely, two separate windings could again be used in FIG. 5 to generate the voltages V′ and V″. Though a source of fixed potential could be used as a reference, it is convenient to utilize the voltage of capacitor 112 for that purpose; thus, I have shown the inputs of voltage comparator 90 connected across diode 111. In operation, thyristor 93 is triggered by the positive voltage peak occurring at the end of a pulse P (cf. FIG. 4) whereby that peak will attain a value close to level V′ before the transient voltage across winding 135 is lowered to level V″ by the conducting thyristor. When the transient voltage drops below the latter level, thyristor 93 is quenched and another cycle is about to begin.

It will be apparent that the ancillary network 103, 131, 132 may be omitted in FIG. 3 or 5 and that, if desired, other such networks could be added as long as they do not draw a charging current interfering with the maintenance of the requisite operating voltage V″.

The supply voltage of battery 70 may vary between rather wide limits, e.g. between 19 and 52 V, without affecting the described generation of different output voltages of predetermined values for the purpose set forth.

I claim:

1. An electroacoustic transducer system comprising:
a capacitive microphone with a high-impedance operating circuit;
an amplifier connected across said operating circuit and provided with an input, said amplifier having an output circuit connected across an alternating-current load;
a source of direct current connected to said output circuit and with said load;
coupling means connected to said output circuit at a location remote from said source for extracting said direct current;
a d-c/d-c converter connected to said coupling means for deriving from said direct current a first and a second unipolar voltage; and
conductor means connected to said converter for supplying said first unipolar voltage to a biasing terminal of said operating circuit and said second unipolar voltage to said input, said converter being provided with a feedback connection from said conductor means for supplying said second unipolar voltage to assure a perfect impedance matching between said amplifier output circuit and said load.

2. A system as defined in claim 1 wherein said output circuit comprises a pair of wires balanced with respect to ground, said source having a grounded terminal and further having an ungrounded terminal connected to said wires via a pair of identical resistors, said coupling means having input circuitry symmetrically connected to said wires.

3. An electroacoustic transducer system comprising:
a capacitive microphone with a high-impedance operating circuit;
an amplifier connected across said operating circuit and provided with an input, said amplifier having an output circuit connected across an alternating-current load;
a source of direct current connected to said output circuit and with said load;
coupling means connected to said output circuit at a location remote from said source for extracting said direct current;
a d-c/d-c converter connected to said coupling means for deriving from said direct current a first and a second unipolar voltage; and
conductor means connected to said converter for supplying said first unipolar voltage to a biasing terminal of said operating circuit and said second unipolar voltage to said energizing input, said converter being provided with a feedback connection from said conductor means for supplying said second unipolar voltage, said converter having a step-down ratio variable by said feedback connection to stabilize at least said second unipolar voltage against variations in the terminal voltage of said source.

4. A system as defined in claim 3 wherein said converter comprises a transformer with primary and secondary winding means, an electronic switch connected in series with said primary winding means to said coupling means, an adjustable pulse generator controlling said electronic switch for periodically blocking the flow of direct current through said primary winding means during cutoff periods of variable duration determined by said feedback connection, said system further comprising first integrating means connected to said secondary winding means for generating said first unipolar voltage, and second integrating means connected to said secondary winding means for generating said second unipolar voltage.

5. A system as defined in claim 4 wherein said first and second integrating means respectively comprise a first and a second diode poled to conduct in response to transient voltages appearing across said secondary winding means at the beginning of each cutoff period.

6. A system as defined in claim 5 wherein said second integrating means includes a storage capacitor and delay means for preventing a charging of said storage capacitor in the presence of a transient voltage until the latter has attained a magnitude corresponding to said first unipolar voltage and exceeding said second unipolar voltage.

7. A system as defined in claim 6 wherein said delay means comprises a Zener diode in series with said storage capacitor and a choke shunting said Zener diode.

8. A system as defined in claim 7 wherein said choke also shunts said second diode.

9. A system as defined in claim 6 wherein said delay means comprises a thyristor in series with said storage capacitor and a comparator connected to trigger said thyristor in the presence of a transient voltage equal to said first unipolar voltage.

10. A system as defined in claim 9 wherein said comparator has inputs connected across said first diode.

11. An electroacoustic transducer system comprising:
a capacitive microphone with a high-impedance operating circuit;
an amplifier connected across said operating circuit and provided with an input, said amplifier having an output circuit connected across an alternating-current load;
a source of direct current connected to said output circuit and with said load;
coupling means connected to said output circuit at a location remote from said source for extracting said direct current;
a d-c/d-c converter connected to said coupling means for deriving from said direct current a unipolar voltage; and
conductor means connected to said converter for supplying said unipolar voltage to said input, said converter being provided with a feedback connection from said conductor means to assure a perfect impedance matching between said amplifier output circuit and said load.

12. A system as defined in claim 11 wherein said converter has a step-down ratio variable by said feedback connection to stabilize said unipolar voltage against variations in a terminal voltage of said source.

* * * * *